(12) United States Patent
Lubart et al.

(10) Patent No.: US 7,428,367 B2
(45) Date of Patent: Sep. 23, 2008

(54) LIGHT CONTROL DEVICES AND METHODS OF MAKING SAME

(75) Inventors: Neil D. Lubart, Austin, TX (US); Timothy J. Wojciechowski, Westlake, OH (US)

(73) Assignee: Brilliant Film LLC, Cleveland, OH (US)

(*) Notice: Subject to any disclaimer, the term of this patent is extended or adjusted under 35 U.S.C. 154(b) by 221 days.

(21) Appl. No.: 10/688,785

(22) Filed: Oct. 17, 2003

(65) Prior Publication Data

US 2005/0140846 A1 Jun. 30, 2005

Related U.S. Application Data

(60) Provisional application No. 60/419,142, filed on Oct. 17, 2002.

(51) Int. Cl.
*G02B 6/10* (2006.01)
*G02B 27/30* (2006.01)

(52) U.S. Cl. .................... 385/146; 385/36; 359/641

(58) Field of Classification Search ............... 385/31, 385/33, 36, 146, 147; 359/641
See application file for complete search history.

(56) References Cited

U.S. PATENT DOCUMENTS

| 5,452,385 A | 9/1995 | Izumi et al. |
| 5,503,902 A | 4/1996 | Steenblik et al. |
| 6,147,725 A | 11/2000 | Yuuki et al. |
| 6,220,058 B1* | 4/2001 | Koyama et al. ............... 65/392 |
| 6,398,370 B1 | 6/2002 | Chiu et al. |
| 6,766,076 B2* | 7/2004 | Hikichi et al. ................. 385/33 |
| 2002/0127565 A1 | 9/2002 | Cunningham et al. |
| 2002/0180909 A1 | 12/2002 | Lubart et al. |

* cited by examiner

*Primary Examiner*—Kevin S. Wood
(74) *Attorney, Agent, or Firm*—Pepper Hamilton LLP

(57) ABSTRACT

A light control device is disclosed that includes a two film construction, each film having a plurality of light reflecting regions. For example, the light absorbing elements can be a series of grooves or column-like indentations in the films that are filled or coated with a light reflecting material having a lower index of refraction than that of the films. The two films can be adjacently disposed so that their respective light reflecting regions form a plurality of light reflecting elements that extend along the thickness direction of the device.

25 Claims, 10 Drawing Sheets

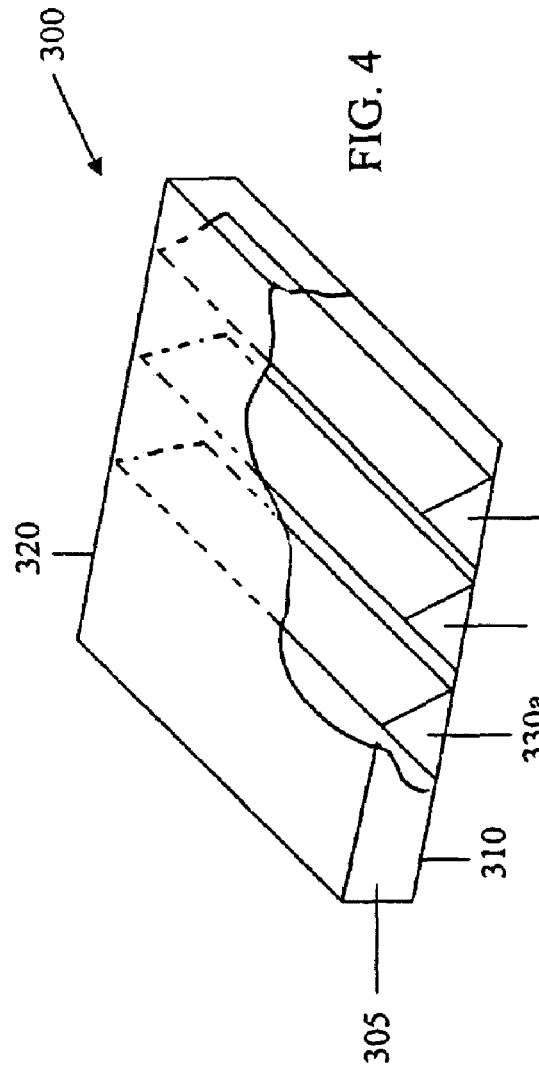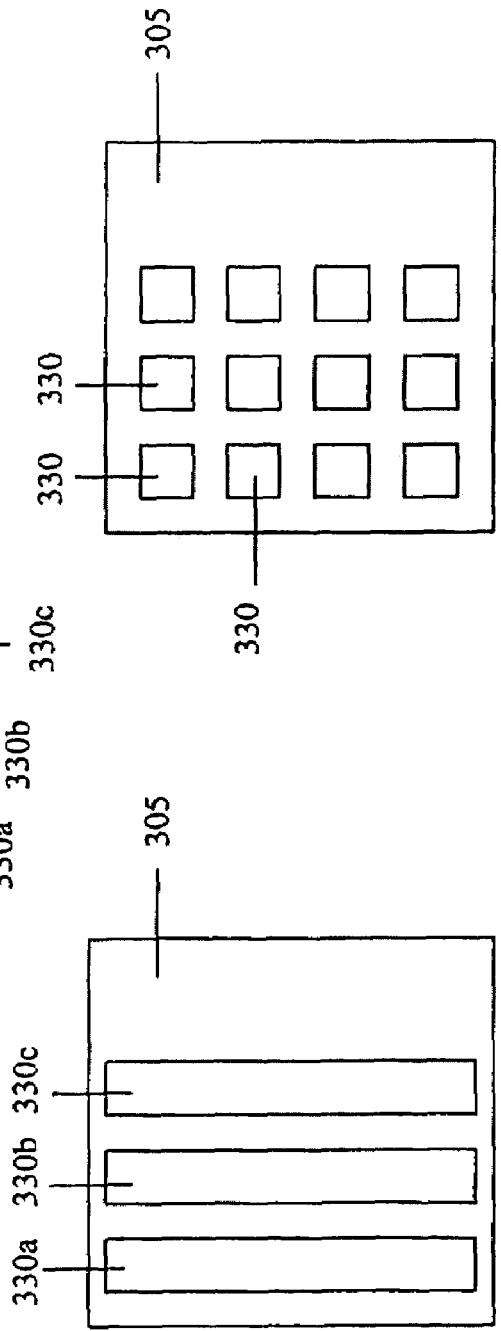
FIG. 4
FIG. 5A
FIG. 5B

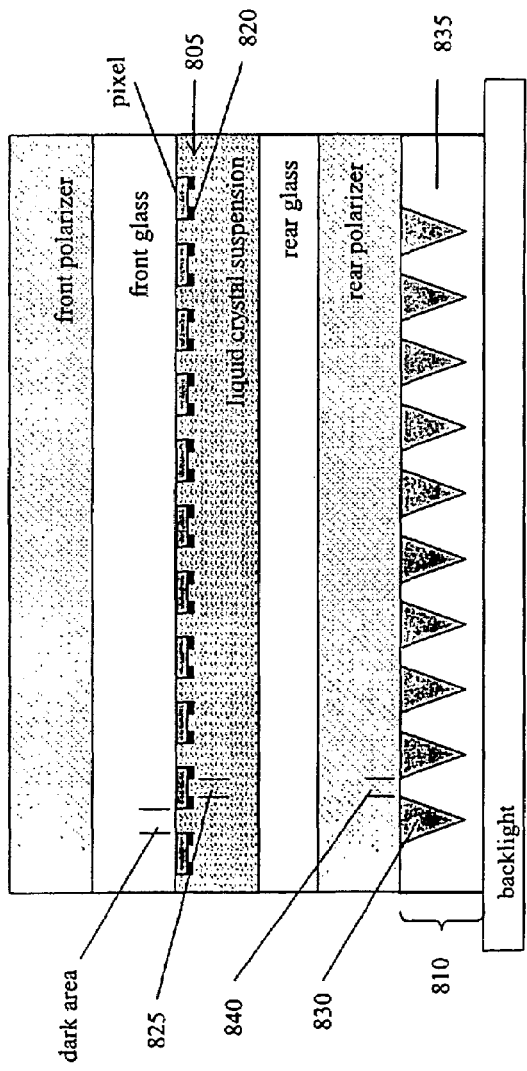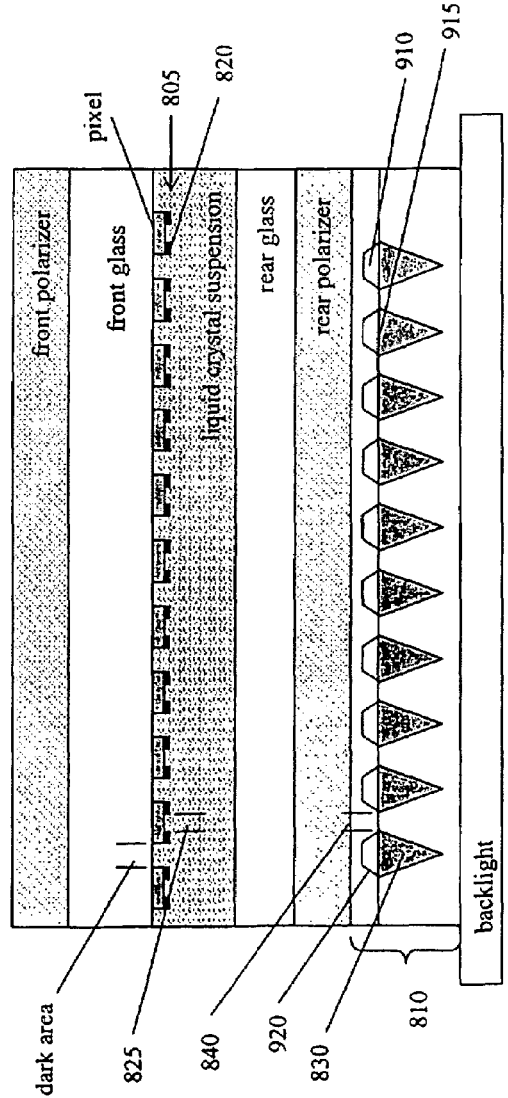

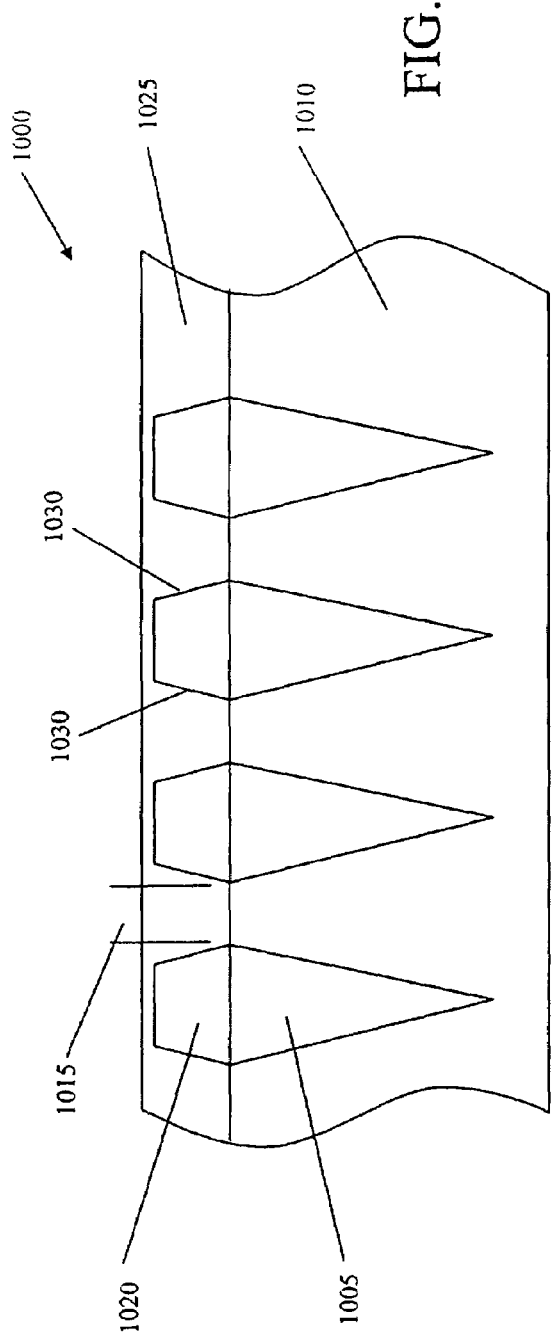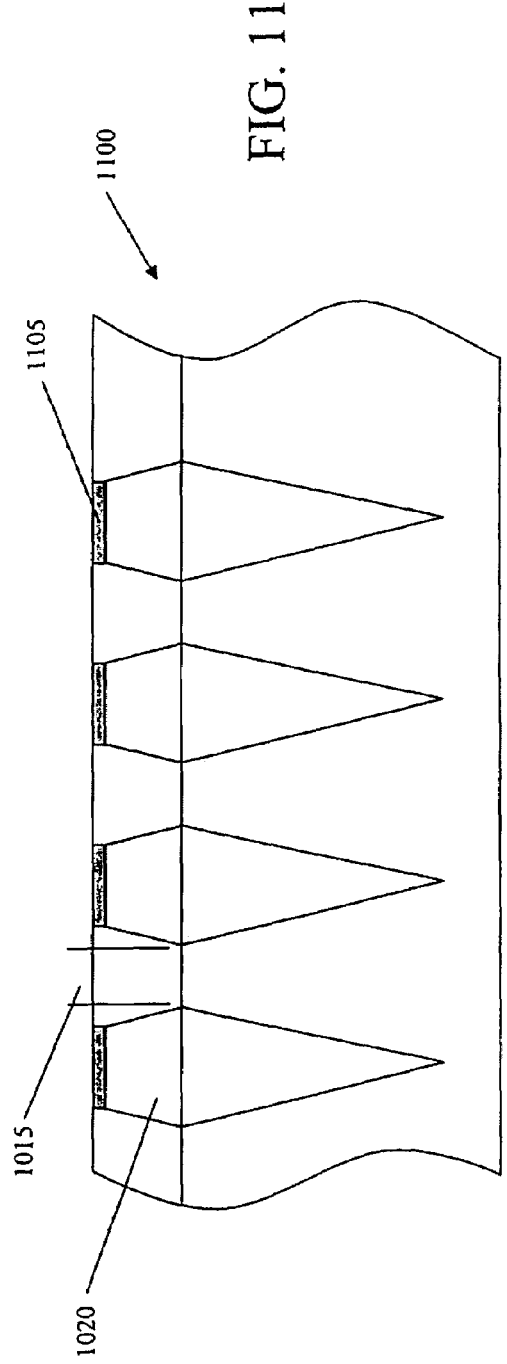

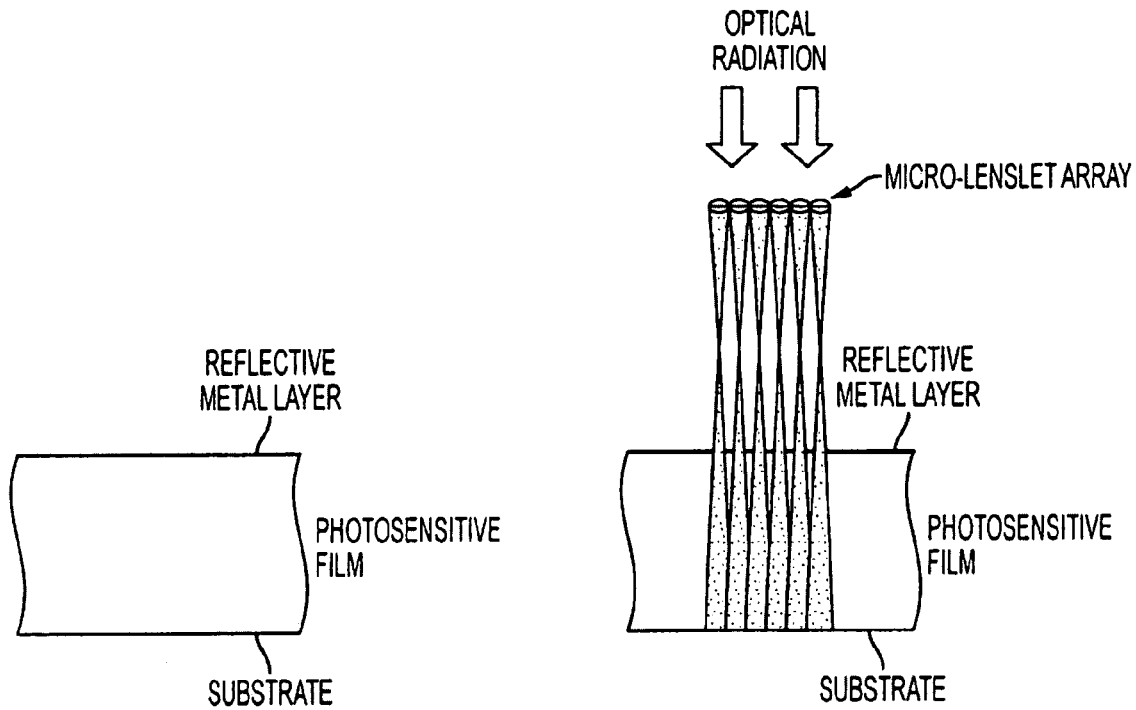
FIG. 12A
FIG. 12B
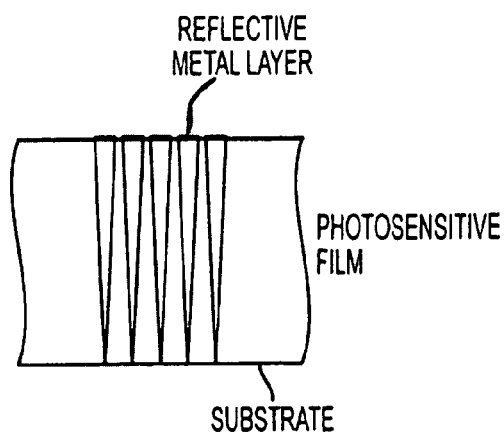
FIG. 12C

LIGHT CONTROL DEVICES AND METHODS OF MAKING SAME

CROSS-REFERENCE TO RELATED APPLICATION

This application claims the benefit of priority of U.S. Provisional Application No. 60/419,142 filed on Oct. 17, 2002, which is hereby incorporated by reference in its entirety herein.

BACKGROUND

1. Field of Invention

This invention relates to all applications where there is a requirement in which reflectivity of incident light (visible through infrared) in one direction and transmissivity in the opposite direction are simultaneously enhanced. That is, the sum of the reflectivity of light from one side and the transmissivity of light from the other side exceeds 1.0.

An application of the present invention includes using the device according to the present invention with any non-emissive display technology—such as electrochromic, ferroelectric, ferromagnetic, electromagnetic, and liquid crystal—where it is desired to use both externally generated light (ambient) and internally generated light (artificial) such as a backlight system. The device is a replacement for the transflective/reflective/transmissive element of the non-emissive displays, where the replaced element is either independent of or integral to the internally generated light (backlight system). Use of this device will allow brightness contributions simultaneously from artificial light and ambient light such that systems will see a significant decrease in power usage. In systems where a battery is used for some or all of the power supply, battery life can be increased by as much as 174%.

2. Description of Prior Art

Non-emissive displays, particularly liquid crystal displays, include either reflective displays or surface light source displays (i.e., transmissive displays), commonly denoted backlit displays. Illustrated in FIG. 1 is a conventional reflective display 100. The conventional reflective display 100 includes a liquid crystal suspension 110 sandwiched between glass plates 120, which are sandwiched between polarizers 130. The glass plates 120 can include color filters, common electrodes, TFT matrix, or other components. The conventional reflective display 100 further includes a reflective layer 140 positioned at the bottom of the stack to redirect light back through the other display elements. In operation, light 150 from an ambient source (e.g., sunlight, artificial light (office lighting)) or light 150 from a light source 160 attached to the top of the stack enters the reflective display 100, passes through the polarizers 130, the glass plates 120, and the liquid crystal suspension 140, and is redirected from the reflective film 150 back through the same layers to produce an image. This display 100 creates an image with available ambient light is limited by the available light. This display 100 is not very effective in producing high quality graphic images and severely limits the quality of color images in a variety of conditions.

Illustrated in FIG. 2 is a conventional backlit display 200. The conventional backlit display 200 includes a liquid crystal suspension 210 sandwiched between glass plates 220, which are sandwiched between polarizers 230. The glass plates 220 can include color filters, common electrodes, TFT matrix, or other components. The conventional backlit display 200 further includes a backlight 240 positioned at the bottom of the stack to produce light 250 and direct it through the layers in the stack. Since this device 200 produces an image with artificial light, it is somewhat limited by the amount of ambient light and, in displays where a battery is used some or all of the time to generate power, the battery life. When ambient light is present, glare is created by light reflecting off the various layers, as described above, without passing through all the layers in the stack. To overcome this glare and to produce an image that is palatable to a user, the backlight gain should be increased to produce more usable light, i.e. more light passing through the layers in the stack. This increase in artificial light can cause an added drain on the battery and, thus, reduces the usability of the system to which the display is attached. As ambient light increases, glare increases and, thus, at some point, the backlight becomes ineffective in producing a palatable image.

Previous attempts to use simultaneously the ambient light and a backlight have resulted in applications that compromise both the transmissive qualities and the reflective qualities of the display. Hochstrate, in U.S. Pat. No. 4,196,973 discloses the use of a transflector for this purpose. Weber, in U.S. Pat. No. 5,686,979, discloses the limitations of the transflector for this purpose and alternatively proposes a switchable window that at one time is wholly transmissive and at another time is wholly reflective.

BRIEF DESCRIPTION OF THE DRAWINGS

These and other features, aspects, and advantages of the present invention will become better understood with regard to the following description, appended claims, and accompanying drawings where:

FIG. 4 illustrates a perspective view of one embodiment of the device 300;

FIG. 5A illustrates a bottom view of FIG. 4;

FIG. 5B illustrates another embodiment of a bottom view of FIG. 4;

FIG. 8 illustrates a cross-sectional view of one embodiment of an LCD display stack 800 including a reflecting layer 805 that is separated from a wave-guide layer 810;

FIG. 9A illustrates a cross-sectional view of another embodiment of an LCD display stack 900 including a reflecting layer 805 that is separated from a wave-guide layer 810;

FIG. 10 illustrates a cross-sectional view of one embodiment of a collimating device 1000;

FIG. 11 illustrates a cross-sectional view of another embodiment of collimating device 1100 that also has reflective properties;

FIG. 12 illustrates a first process for making devices discussed herein by forming the desired reflecting structures in a photosensitive film.

DETAILED DESCRIPTION OF THE INVENTION

A device having reflective and transmissive properties can include (i) means for transmitting light arriving from a first direction and emanating from a first, independent source; and (ii) means for reflecting light arriving from a second direction and emanating from a second, independent source, wherein the sum of the percentage of light being transmitted relative to the amount of light coming from said first direction and the percentage of light being reflected relative to the amount of light coming from said second direction, is greater than 100 percent.

The term "light", as used herein encompasses electromagnetic radiation with wavelengths corresponding to visible through infrared. The present invention is, however, applicable to any electromagnetic radiation that is capable of being reflected or refracted, subject to the ability to create structures of a size and a material to do so. Specifically, the present invention can find applicability in the radio, radar, microwave, infrared, visible, ultraviolet, x-ray and gamma forms of radiation. Also, the present invention can have applicability in other forms of energy.

$R_1$=reflectivity from one side
$T_1$=transmissivity from one side
$A_1$=absorptivity from one side
$R_2$=reflectivity from the other side
$T_2$=transmissivity from the other side
$A_2$=absorptive from the other side
From the conservation of energy:

$$R_1+T_1+A_1=1 \text{ and } R_2+T_2+A_2=1$$

In the prior art of transflectors, $R=R_1=R_2$; $T=T_1=T_2$; and $A=A_1=A_2$. It follows that in the prior designs, $R+T=1$ when $A=0$. Even where prior art claims to overcome the limit of transflectors and where the disclosed transflector is meant to channel or direct light, no overall transmittance or reflectance is shown so that any possible gain cannot be determined and is not apparent.

In this art, the value of the reflectance on one side of the film is significantly decoupled from the value of the reflectance on the other side, and the value of the transmissivity on one side is significantly decoupled from the value of the transmissivity on the other side. This newly disclosed film allows $R_1 \neq R_2$, $T_1 \neq T_2$, and $A_1 \neq A_2$. A specific embodiment will be shown below in which $T_1$, $R_2$, $A_1$, and $A_2$ are small. It follows that $R_1+T_2>1$. This disclosed film multiplies the transflecting effect. In the theoretical limit, for this non-emissive version of the film, $T_1=R_2=A_1=A_2=0$. Then $R_1+T_2=2$.

As used herein, a device having reflective and transmissive properties is capable of transmitting and reflecting light. The sum of the percent of light capable of being reflected, plus the sum of light capable of being transmitted, will be greater than 100 percent.

Figure 1:
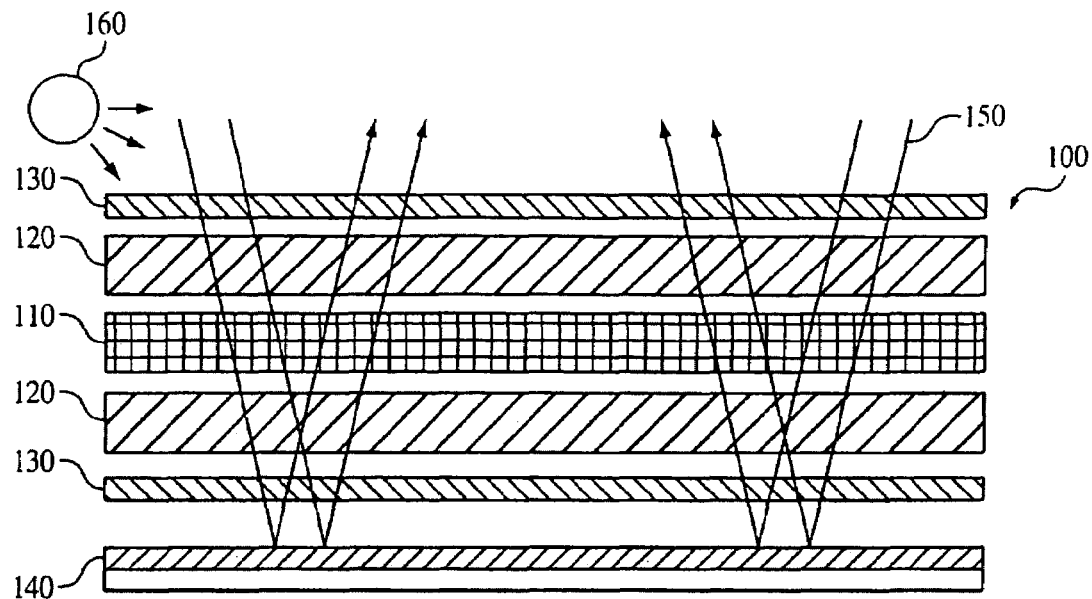
FIG. 1 (prior art) is a diagram showing the operation of a conventional reflective display.
Figure 2:
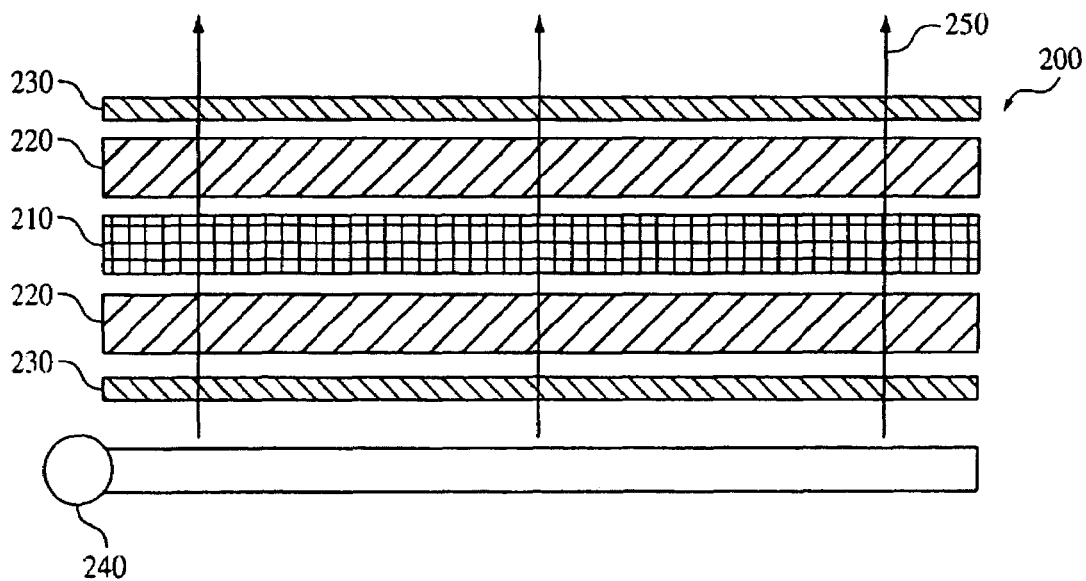
FIG. 2 (prior art) is a diagram showing the operation of a conventional backlight display.
Figure 3:
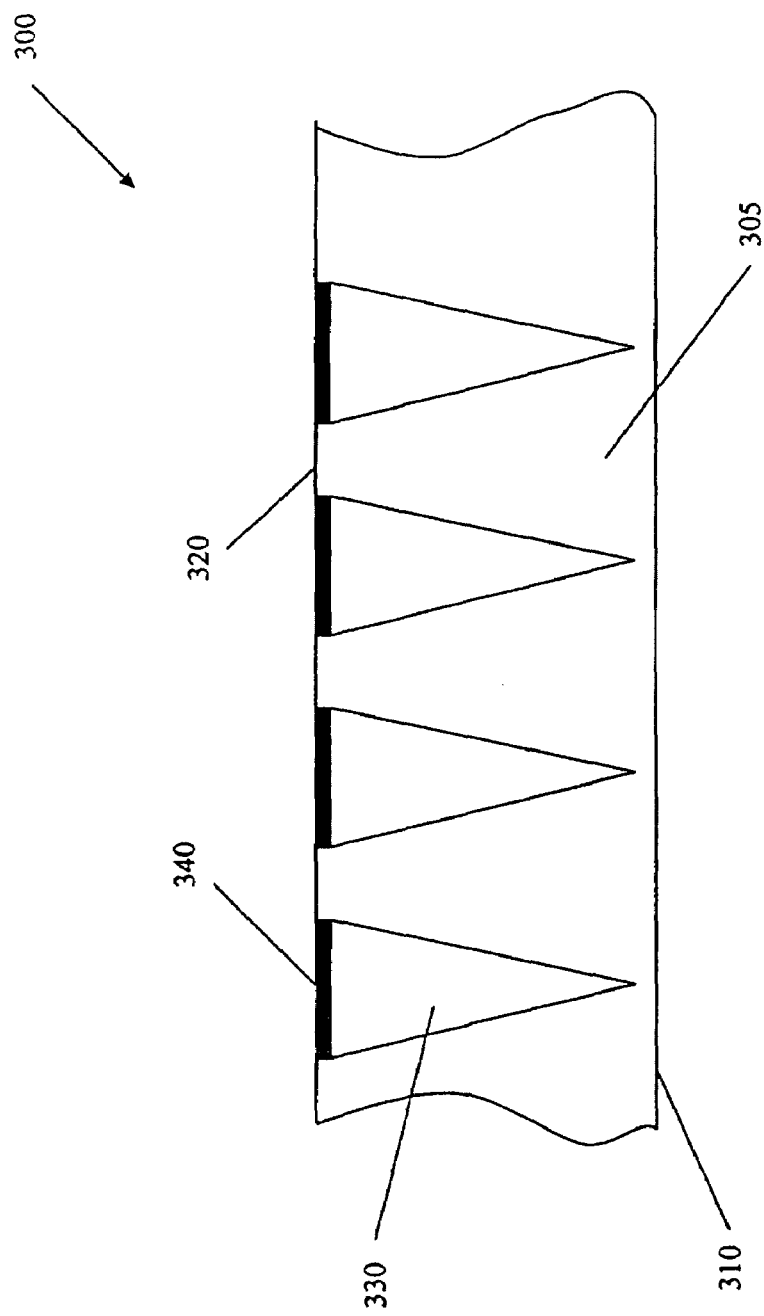
FIG. 3 illustrates a cross-sectional view of one embodiment of a device 300 having reflective and transmissive properties.

FIG. 3 illustrates a cross-sectional view of one embodiment of a device 300 having reflective and transmissive properties. In one embodiment, the device 300 includes transmitting means such as a transparent material or substrate 305 having a first surface 310 and an opposing, second surface 320. The device 300 can further include reflecting means such as a plurality of reflective structures 330 positioned within the transparent substrate 305. One example of a device having reflective and transmissive properties is described and illustrated in U.S. Pat. No. 6,473,220 owned by Trivium Technologies, Inc., which is hereby incorporated by reference in its entirety herein.

For purposes of the present application, the terms "reflective or reflection" as used herein, when discussing light striking the body of the structure, also include "refractive or refraction" where the difference in the index of refraction of the materials, along with the angle of incidence, results in substantial or near total reflection of the light striking the structure. As used in this application, the term "structure" as used herein refers to the shape of the element refracting or reflecting light. The structure may be a physically separate item mounted on or in the transmissive material, it may be formed or represent a groove or indentation that has been cut into the transmitting material, or it may be the end result of treatment of portions of the transmissive material such that a shape having a different index of refraction is formed. Where the transmissive material is a gas or vacuum, the structure is mounted "in" the material by means of a grid, wire, filament or other such device, with the grid representing a surface of the transflector.

Illustrated in FIG. 4 is a partial cutout perspective view of a device 300 which has a light receiving side 310 (or light transmissive side) and a light reflecting underside 320. The example shows three light reflecting structures 330a, 330b, 330c that are positioned side by side, but spaced apart a selected dimension as described above. A view from the under side 320 is shown in FIG. 5A. In this embodiment, the reflective structures 330a-c have a shape that decrease in size towards the transmissive side 310 and increase in size towards the reflective underside 320. Although a triangular shape is shown, any shape may be used which is generally smaller at the light transmissive side 310 than at the light reflective side 320. It will be appreciated that the sidewalls of the reflective structure 330a-c may or may not be smooth based on a desired effect and manufacturing tolerances. Each structure 330a-c has an elongated body that can extend the length of the device 300 or a sub-portion thereof. For example, FIG. 5B shows an embodiment where the reflective structures 330 are formed or deposited within the transmissive substrate 305 as smaller units uniformly distributed and oriented in the device 300. Each structure 330 is shown having a square base adjacent the reflective side 320, however, any desired shape may be used as the base and the structures 330 may be oriented in any desired pattern including a random pattern. It will be appreciated that dimensions in all illustrative figures are not to scale.

In one embodiment, the cross-section of the reflective structures 330 is triangular shaped each having a base 340 and a pair of sidewalls 350. Each sidewall 350 is at an angle relative to the base 340. In one embodiment, the base 340 is associated with a reflective layer. The angle may be between about 83 degrees and less than 90 degrees. If collimating film is used in conjunction with the device, then the angle may be between about 76 degrees and less than 90 degrees. In one embodiment, the width of the base may be between about 2µ and 200µ. The base of each structure may be separated by a distance between about 1µ and about 100µ. In one embodiment, the structures may have a aspect ratio (i.e., the ratio of the height to the base) of between about 2 and about 22.

The performance of the device 300 can be varied by adjusting various factors such as the aspect ratio (i.e., the ratio of the height to the base) of the reflecting structures 330, the spacing between the reflecting structures 330, and the materials used to construct the device. These factors can determine: (1) the allowable incident angle of the energy entering the device from one direction (transmissive), (2) the proportion of energy transmitted from that direction, (3) the proportion of energy reflected by the opposite side of the device, (4) the distribution of energy emerging from the element, and (5) the percentage of energy lost to internal absorption or scattering. The aspect ratio of the reflecting structures 330 can determine the relationship between the specific angle at which the transmitted light enters the device and the angle at which the transmitted light emerges from the device. The spacing between the reflecting structures 330 can determine the proportion of light reflected by the device (from the reflective side) and the distribution of transmitted light (from the transmissive side). By increasing the spacing between the reflecting structures 330, a smaller proportion of light is redirected from the transmissive side while reflection of light from the opposite direction is reduced. Conversely, by decreasing the spacing between the reflecting structures 330, a greater proportion of the transmitted light will be redirected while a larger proportion of the light from the opposite direction will be reflected.

The cross-section of the reflecting structures 330 (and any other reflecting structure described herein) may assume the shape of any polygon that may be arranged in a variety of patterns. In one embodiment, the cross-section of the reflective structures 330 is a triangle where the base of the triangle is situated adjacent to the second surface and the apex (i.e., tip) of the triangle is situated closer to the first surface of the transparent substrate 305. It will be appreciated that the structures may be replaced by a series of discrete objects such as pyramids, cones, or any polyhedron, and likewise may be arranged in a variety of patterns or randomly.

The reflecting structures 330 (and any other reflecting structure described herein) may be repeated in parallel and spaced across the area of the transparent substrate 305. For example, the reflecting structures 330 can be arranged in triangular cross-sectional rows within the transparent substrate 305. The reflecting structures 330 (and any other reflecting structure described herein) may be arranged in varying shapes, heights, angles, or spacing before a pattern is repeated. Furthermore, the aspect ratio and shape of the structures or discrete objects may vary periodically. By periodic, it is meant that structures eventually repeat. For example, in the case where there are three structures, first consider structure one and structure two. The structures may have different aspect ratios or shapes and be different distances from the surface of the device. In addition, the distance between structures one and two may not be the same as between structures two and three. However, structures four, five and six repeat the distribution of structures one, two and three. Thus, eventually, the structures repeat and there can be long-range order or periodicity. Varying the size, shape, and distance between structures may be used to eliminate diffraction patterns due to its ability to disrupt short-range periodicity. Varying the size, shape, and distance between structures may also eliminate diffraction patterns from causing distortions in larger displays greater than five inches in diagonal.

In one embodiment, the cross-section of a single reflecting structure 330 (and any other reflecting structure described herein) is triangular and forms a row that can be oriented in the transparent substrate 305 such that the base 340 of the triangle is parallel to and coincident with the plane of one surface of the transparent substrate 305 of the device 300. However, it will be appreciated that the base of the reflecting structure (e.g., triangular cross-section) may be recessed from the plane of the surface of the transparent substrate of the device such that the reflecting structure is embedded within the transparent substrate. In this case, the embedded reflecting structure may be constructed in the following ways: i) a solid reflective structure made of metal or another reflective material; ii) a polymer structure (having a lower index of refraction than the transparent film material) coated with a reflective material at the base of the structure; and iii) a solid polymer structure (having a lower index of refraction than the transparent film material) and a reflective layer separated from the solid polymer structure yet still embedded within the transparent film material.

The discrete faces (e.g., the base 340 and side walls 350) of the reflecting structure 330 (and any other reflecting structure described herein) may be planar, concave, convex, or pitted such that light reflecting from any face may be controlled. In other embodiments, one or more of the discrete faces of the row of reflecting structures, or discrete shapes, may be planar, concave, convex, and/or pitted. Additionally, micro-structures (e.g., pyramids or cones) may be deposited on the flattened base of each reflecting structure to further control the direction of reflected energy and to focus the diffused ambient energy in a forward direction, increasing the effective reflectivity. Also, a non-flat surface on the base of the reflecting structure (e.g., concave dimples) can reduce specular reflections. In one embodiment, the height of the dimples is between about $0.1\mu$ and $1\mu$ ($\mu$=micron). Additionally, the base of a triangular cross-sectional reflecting structure may have different features than the other faces (i.e., the side walls) of that very same reflecting structure. These features may include planar, concave, convex, pitted, or dimpled surfaces. Furthermore, the discrete faces of each reflecting structure may converge to form either a sharp point or a radius of curvature. A radius of curvature applied on the structure's reflective coating will eliminate sharp edges. Such edges may create unwanted diffraction effects in this application. A radius applied to the edges of the exterior reflective surface adjacent to the window opening can be used to minimize or eliminate such diffraction effects.

The transparent substrate 305 (and any other transparent substrate described herein) can include any light transmissive polymer, glass, or other composite material. The transparent substrate 305 should be highly optically transmissive to visible, ultraviolet, and/or near infrared light between about 300-2,500 nanometers, stable to ultraviolet light, impervious to moisture, non-hygroscopic, scratch resistant, and easy to keep clean, with an appropriately chosen refractive index to match the other elements of the system in which it is a part. In one embodiment, the transparent substrate 305 can have specific properties that minimize absorption and redirection of energy—such as internal scattering. If an adhesive is used to secure the device in an application, the adhesive should be highly optically transmissive to light between about 300-2,500 nanometers and stable to ultraviolet light.

By using basic geometry and a rudimentary understanding of geometric optics, one skilled in the art can calculate what aspect ratio and width between structures is necessary to preferably redirect light striking near the tip no more than twice before exiting. For example, a light ray striking a triangular row of structures near the tip will have the most number of redirections before possibly exiting the element. A geometric plot of the light ray path can be used to derive the relationships between the various parameters, including the constraints of the system. The height of the structure will be determined by several factors, among which is the thickness of the transparent material. If the requirement of a specific application is to transmit light through the transflector within 10 degrees of perpendicular, then assuming a height, one can plot or calculate the apex angle. The apex angle and the height will give the aspect ratio and thus the width of the base of the structure.

The general relationship between the aspect ratio of height to base for the reflecting structures and the spacing between structures is illustrated in the following examples:

Example 1

A single structure is triangular in cross section and extends along the full length of the device from one side to the other. The above structure is repeated at regular intervals such that one side of the entire body of the device is covered with the bases of alternating triangular rows and spaces in-between. If the specific application requirement for the device calls for approximately 66.6% of the energy from one side (the reflecting side) is to be reflected and the transmitted energy from the opposite side is restricted to emerge about 5°, than the aspect ratio must be a minimum of 11.5:1. The spacing between the structures in this example will be approximately half the dimension of the base of a structure. In this example, the sum of potentially useful reflected energy from one side R plus the sum of potentially useful transmitted energy from the opposite side T is approximately 1.66 (R+T=1.66). This can be restated as 66.6% of the energy entering the device from the reflective side is reflected and 100% of energy entering the element from the transmissive side is transmitted (R=66.6% and T=100% so that R+T=166%).

Example 2

Assume that the structures are the same as in example 1 and that the specific application requirements call for maximizing the amount of transmitted energy independent of any specific angle of emergence. Also assume that the energy entering the element from the transmissive side is uniformly collimated within about 10° of perpendicular to the plane of the device. In this example, the requirements are for reflection of about 80% of the energy in one direction (the reflecting side) and for transmission of more than 95% of the energy from the opposite side (the transmitting side). A device with an aspect ratio of 15:1 will be approximately 96.8% transmissive, assuming a perfectly reflecting material for the structures. The spacing between the structures is about one-fourth the dimension of the shaped structures. In this example, the sum of potentially useful reflected energy from one side R plus the sum of potentially useful transmitted energy from the opposite side T is approximately 1.77 (R+T=1.77).

Figure 6:
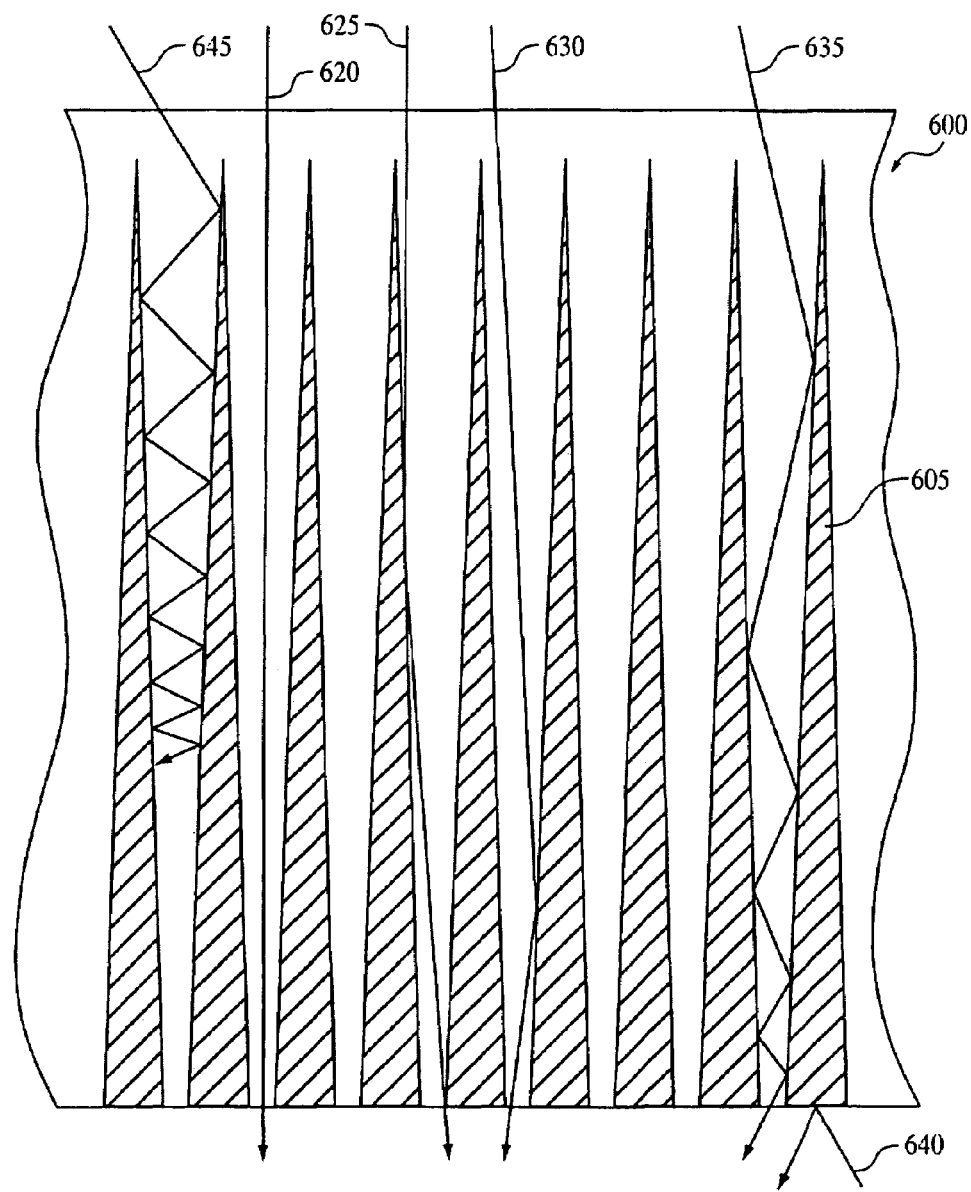
FIG. 6 illustrates a cross-sectional view of another embodiment of a device 600 having reflective and transmissive properties.

Illustrated in FIG. 6 is a cross-sectional view of another embodiment of a device 600 having reflective and transmissive properties. In this embodiment, the device 600 includes reflective structures 605 having an aspect ratio of about 14.3, a spacing between the structures 605 of about 25% of the base width, and the structures 605 evenly spaced across the body of the device 600. This device can produce a transmissivity of about 94% of light rays entering the device 600 perpendicular to the plane from the side closest to the apex (tip) 610 of the structures 640 (transmissive side). Additionally, the device 600 can provide the additional benefit of reflecting about 76% of light striking the device 600 from the opposite direction (reflective side). In this example, about 20% of light entering from the transmissive side can pass through the device 600 without redirection, about 40% will pass through the device 600 with a single redirection (4 degrees relative to perpendicular to the plane of the element) and about 40% of the light will have two redirections (8 degrees relative to perpendicular to the plane of the element). Accordingly, this embodiment can provide an R+T of up to 1.70.

In operation, light ray 620 can enter the device 600 perpendicular to the plane of the device 600, passes through the device 600 without striking a structure 605, and can exit the device 600 without redirection. Light ray 625 can enter the device 600 perpendicular to the plane of the device 600, strikes the midpoint of a structure 605, and is minimally redirected (4 degrees relative to perpendicular to the plane of the device 600) such that it exits the device 600 without striking an adjacent structure 605. Light ray 630 can enter the device 600 perpendicular to the plane of the device 600, strike a structure 605 near the apex (tip), and is minimally redirected (4 degrees relative to perpendicular to the plane of the device 600) such that it can strike an adjacent structure 605 near the base of the structure 605, and is again minimally redirected (as above) such that the total redirection of the light ray 630 is 8 degrees from the perpendicular to the plane of the device 600 upon exiting the device 600. Light ray 635 can enter the device 600 at an angle greater than 10 degrees of perpendicular to the plane of the device 600 and strikes a structure 605 above the midpoint and is minimally redirected (4 degrees relative to perpendicular to the plane of the device 600). Due to the increased angle of entry of light ray 635, multiple redirections occur before the light ray 635 exits the device 600. In this example, seven redirections are necessary for light ray the 635 to exit the element—the cumulative redirection is about 28 degrees. Light ray 640 is reflected by a structure 605 at an angle equal to the angle of incidence. Light ray 645 can enter the device 600 at a steep angle relative to the perpendicular to the plane and strikes a structure 605 near the apex (tip). Due to the cumulative redirection, light ray 645 cannot exit the opposite side of the device 600.

Figure 7:
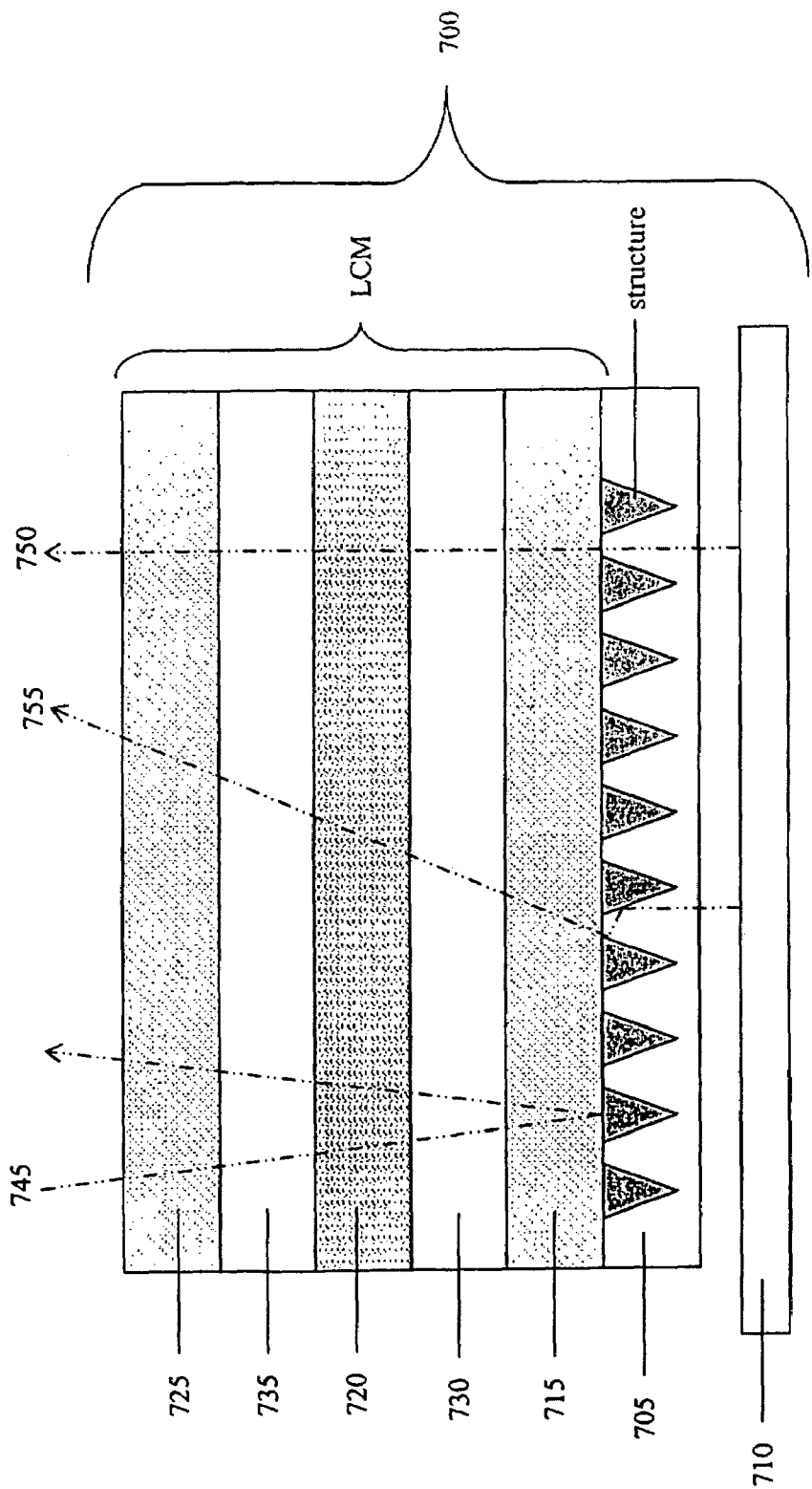
FIG. 7 illustrates a cross-sectional view of one embodiment of an LCD display stack 700 utilizing a device 705 having reflective and transmissive properties.

One application of a device having reflective and transmissive properties is use a non-emissive display system, such as a liquid crystal display (LCD), or other device in which light is directed for the purpose of creating an image. Illustrated in FIG. 7 is a cross-sectional view of one embodiment of an LCD 700 utilizing a device 705 having reflective and transmissive properties. As shown in FIG. 7, an LCD stack includes a backlight assembly 710 and a liquid crystal module (LCM), which includes a rear polarizer 715, a liquid crystal suspension 720, and front polarizer 725. In one embodiment, the LCM may include a rear glass plate 730 provided in between the rear polarizer 715 and the liquid crystal suspension 720, and a front glass plate 735 provided in between the front polarizer 725 and the liquid crystal suspension 720. The glass plates 730, 735 can include color filters, common electrodes, TFT matrix, or other components.

In one embodiment, the device 705 can be positioned in between the backlight 710 and the rear polarizer 715 such that its reflective surface faces the LCM and its transmitting surface faces the backlight assembly 710. The device 705 may be a component of the backlight 710, or may be attached to a component of the remainder of the LCM or LCD.

In one embodiment, the device 705 can be used in an LCD stack or any other type of display. For example, the device 705 can be positioned within the liquid crystal module itself in three configurations: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. For a two-polarizer liquid crystal display system, only the second configuration is possible in order for the display to process the light. For a single polarizer liquid crystal display system, all three configurations are possible as the display can process the light.

A process for manufacturing a liquid crystal module is disclosed whereby the device 705 is a foil or a component within or adhered to the existing LCD stack. "Within or adhered to" includes: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. The LCD manufacturing process can be done on a roll-to-roll and/or assembled-by-layer basis for any of the embodiments described and the device is an integral part of the stack. The layers of the LCD stack are produced and/or assembled on a roll-to-roll basis, and the device is inherent as a part of the glass, pixel, collimator, or polarizer. The device construction is based on layering functional components onto a liquid crystal module substrate, allowing the device to be constructed as part of the overall liquid crystal module manufacturing process. Such elements may be glued or epoxied to the layered components. Elements such as ¼ wave plate, linear polarizers, collimating film, brightness enhancement film, polarizer film and light recycling elements may also be integrated into the liquid crystal displays or other displays such as, but not limited to, a color super twisted nematic.

In operation, ambient light ray 740 can pass through the various layers of polarizers 715, 725, glass plates 730, 735 (if present), and the liquid crystal suspension 720 and can be redirected by the reflective structures in the device 705 back through the various layers of the LCM. At the same time, artificial light ray 745 generated from the backlight assembly 710 can pass through the transparent substrate of the device 705 without striking a reflective structure, and exit the device 700 without redirection. Also, artificial light ray 750 can enter the device 705 perpendicular to the plane of the device 705, strike a structure near the apex (tip) and is minimally redirected such that it strikes an adjacent structure near the base of the structure, and is again minimally redirected as the light ray 750 exits the device 705.

As described above, the reflective material may be provided on the transparent substrate above the reflective structure, part of the fill for grooves in the transparent substrate, or provided on the base of the reflective structure. In another embodiment, the device may include two separate components: 1) a wave guide layer (which includes the reflective structures) and 2) a reflecting layer having reflective areas with apertures there between, which is separate from the wave-guide layer. The reflective areas of the reflecting layer can be associated with (e.g., lined up with), but separated from, the base of the reflective structures in the wave-guide layer.

Illustrated in FIG. 8 is a cross-sectional view of one embodiment of an LCD display stack including a reflecting layer 805 that is separated from a wave-guide layer 810. In this embodiment, the reflecting layer 805 can include reflecting portions 820 separated by apertures 825 and the wave-guide layer 810 can include spaced apart reflective structures 830 (e.g., indentations filled with air or other material, structures made from different materials having different indexes of refraction, etc.) provided in a transparent substrate 835 defining apertures 840 between each reflective structure 830. When used in an LCD display, there can be greater efficiency in the reflecting layer 805 by locating it on the interior side of a LCD rear glass (or polymer) so that the reflecting portions 820 are only microns from the pixels. In this embodiment, the reflective layer 805 can be provided at the pixel level. For example, a portion of the bottom surface of each pixel can be reflective. The portion of the pixel not part of the reflective layer allows for the transmissive portion of the liquid crystal display and is aligned with the apertures of the reflective structures 830 in the wave-guide layer 810. The wave-guide layer 810 can be located adjacent or attached to the backlight assembly in an LCD display system.

In one embodiment, the reflective structures 830 in the wave-guide layer 810 can be triangular in cross-section as shown in FIG. 8. In this embodiment, the side of the wave-guide layer 810 having the apex of the triangular-shaped reflective structures 830 would face the backlight assembly of an LCD system, while the side of the wave-guide layer 810 having the bases of the triangular-shaped reflective structures 830 would face the reflective layer 805. The apertures 840 between the reflective structures 830 in the wave-guide layer 810 can be, for example, aligned with the apertures 825 between the reflective portions 820 of the reflecting layer 805. This can allow for the highest degree of transmission through the reflecting layer 805.

In one embodiment, a glass (or polymer) and a polarizer may be provided between the reflecting layer 805 and the wave-guide layer 810. In another embodiment, collimating film may be provided between the reflective layer 805 and the wave-guide layer 810, alone or in combination with other components, to direct the device-generated light (i.e., backlight assembly) in a maximally efficient manner to the apertures 825 of the reflecting layer 805. The collimating film may be provided as an entire layer between the reflective layer 805 and the wave-guide layer 810 or may be provided in portions that are generally aligned with the apertures 840 between the reflective structures 830 in the wave-guide layer 810.

Illustrated in FIG. 9A is a cross-sectional view of another embodiment of an LCD display stack including a reflecting layer 805 that is separated from a wave-guide layer 810. This embodiment is similar in structure to the embodiment described above and illustrated in FIG. 8; however, the wave-guide layer 810 in this embodiment includes exit control reflective structures 910 (e.g., indentations filled with air or other material, structures made from different materials having different indexes of refraction, etc.) to control the distribution of artificial light (exiting from the backlight assembly) as it passes through the wave-guide layer 810.

As shown in FIG. 9A, the exit control reflecting structures 910 can be associated with the reflecting structures 830. For example, exit control reflecting structures 910 can extend from and be aligned with the reflecting structures 830. In one embodiment, the cross-sectional shape of the exit control structures 910 can be isosceles trapezoids or truncated isosceles triangles. However, it will be appreciated that the exit control structure may take the form of any shape. In one embodiment, the exit control reflecting structures 910 can share a base 915 with the reflective structures 830. For example, the base of each exit control reflecting structure 910 and the base of each reflective structure 830 can be contiguous with each other. In one embodiment, the width of the base of each exit control reflecting structure 910 is equal to the width of the base of each reflecting structure 830. Optionally, the width of the base of each exit control reflecting structure 910 is less than the width of the base of each reflecting structure 830 to account for any misalignment if the exit control reflecting structures 910 and the reflecting structures 830 are provided in separate components (e.g., glass or polymer where the structures are filled with air or other material having a lower index of refraction than the substrate of the glass or polymer).

Each exit control reflecting structure 910 can include a pair of sidewalls 920 oriented at a predetermined sidewall angle (with respect to the base of the exit control reflecting structure 910) that modifies both the direction and angle of reflection. The predetermined sidewall angle can be less than 90 degrees but greater than 0 degrees. Optionally, along the sidewalls 920 of the exit control reflecting structure 910, a repeated series of miniature right angle structures may be repeated. Although the illustrated geometric shape of the exit control reflecting structure 910 is a trapezoid, the exit control reflecting structure 910 may take the form of many shapes or combination of shapes such as a triangle where the top of the exit control reflecting structure 910 is pointed. The sidewalls 920 can be made reflective through coating with metal or by total internal reflection (e.g., with two different index of refraction polymers or a polymer to air boundary).

Figure 9B:
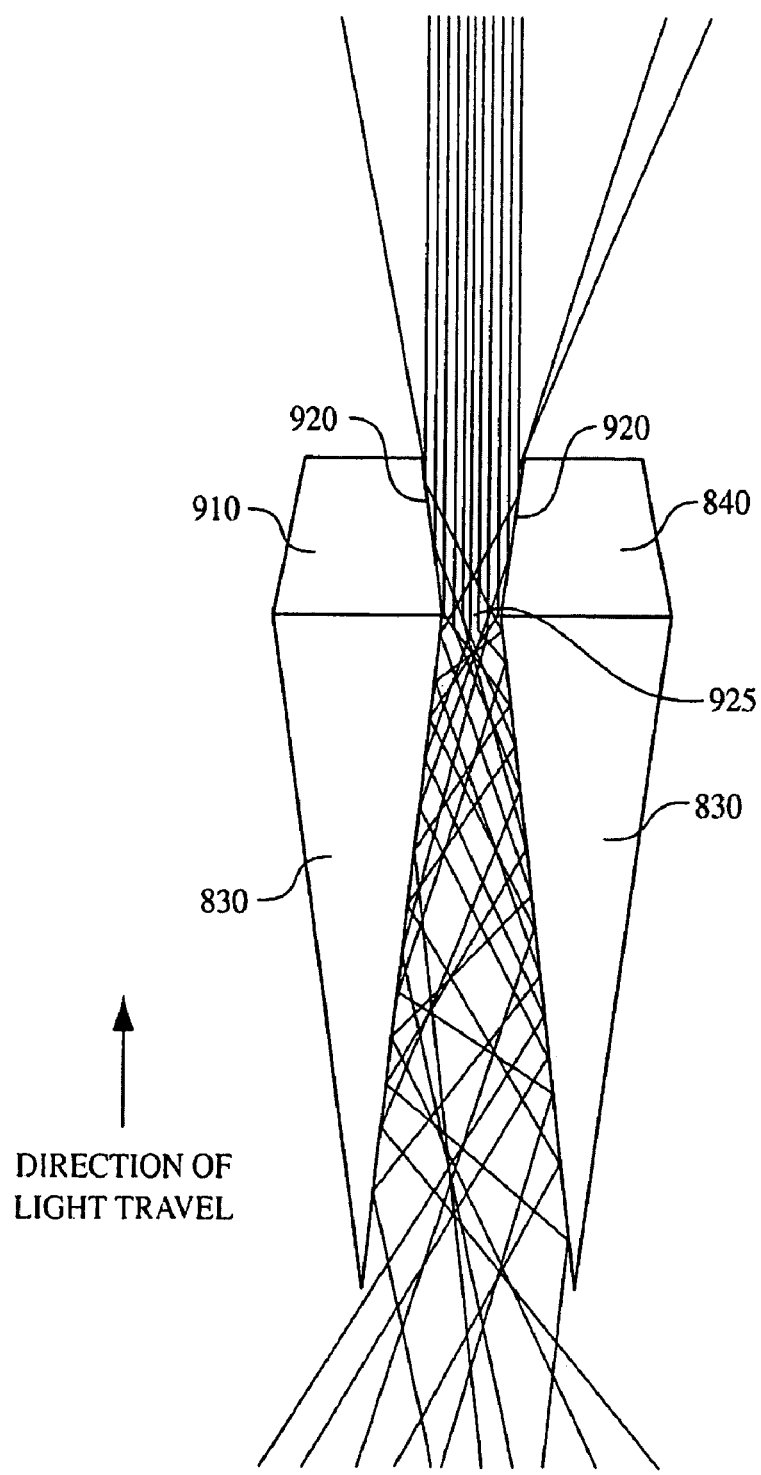
FIG. 9B illustrates a computer model of the wave-guide layer 810 in use and its effect on light as it passes through the reflecting structures 830 and exit control reflecting structures 910.
Figure 13A:
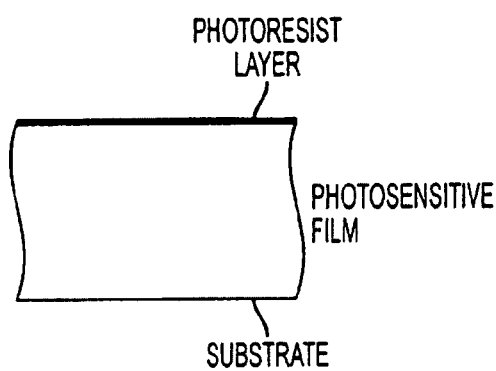
FIG. 13 illustrates a second process for making devices discussed herein by forming the desired reflecting structures in a photosensitive film.
Figure 13B:
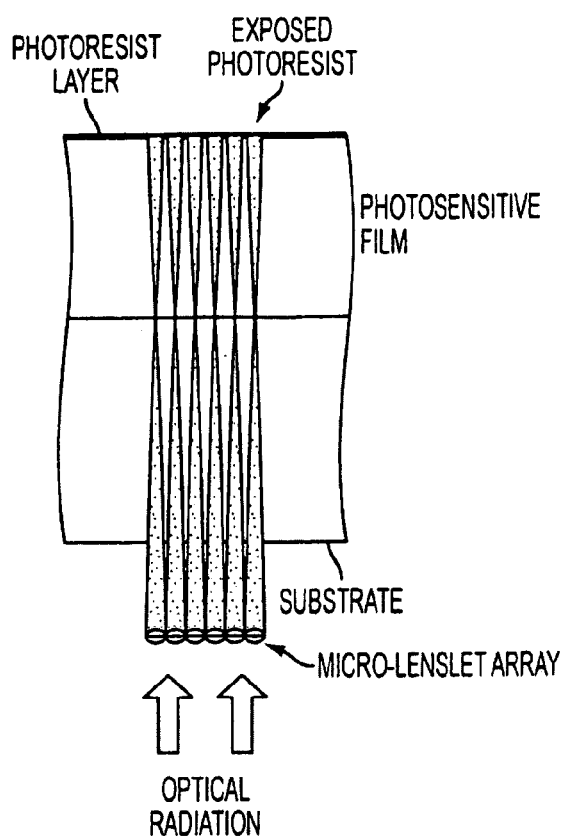
Figure 13C:
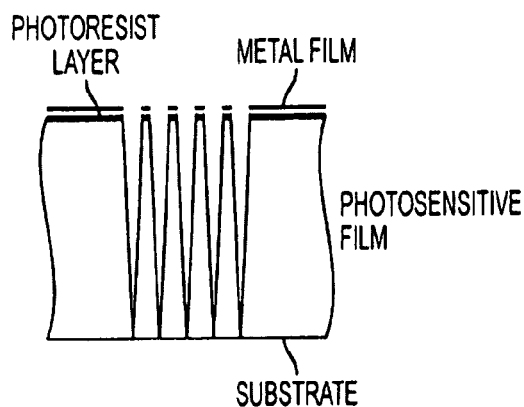
Figure 13D:
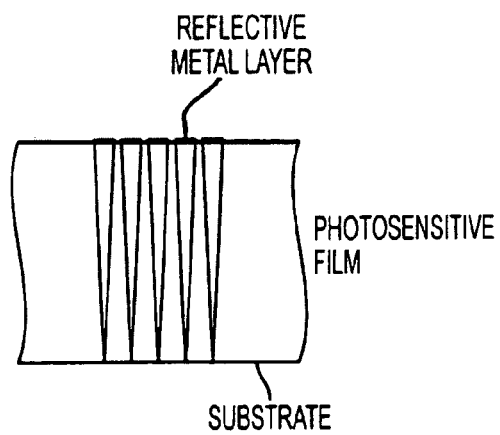

In use, artificial light (from the backlight assembly) can exit the reflecting structures 830 of the wave-guide layer, strike the sloped sidewalls 920 of the adjacent exit control reflecting structures 910, and be reflected at an angle equal to the incident angle plus twice the angle of the sidewall 920 as measured from a line perpendicular to the base of the exit control reflecting structure 910. Essentially, the exit control reflecting structures 910 can control the collimation of the light as it exits the reflecting structures 830 as shown in FIG. 9B, which is a model that illustrates the effect on light as it passes through the exit control reflecting structures 910 and the reflecting structures 830.

Illustrated in FIG. 10 is a cross-sectional view of one embodiment of a collimating device 1000. The collimating device 1000 can include spaced apart reflective structures 1005 (e.g., indentations filled with air or other material, structures made from different materials having different indexes of refraction, etc.) provided in a transparent substrate 1010 defining apertures 1015 between each reflective structure 1005. The transparent substrate 1025 can be glass or any type of polymer as described above. In one embodiment, the reflective structures 1005 can be triangular in cross-section. However, it will be appreciated that the reflecting structure may take the form of any shape including a trapezoidal cross section.

The device 1000 can further include exit control reflective structures 1020 (e.g., indentations filled with air or other material, structures made from different materials having different indexes of refraction, etc.) provided in a transparent substrate 1025 to control the distribution of light as it exits the reflective structures 1005. The transparent substrate 1025 can be glass or any type of polymer as described above. The transparent substrates 1010, 1025 can be laminated together or can be bonded together using an optical adhesive. In one embodiment, the transparent substrates 1010, 1025 have the same index of refraction, though it is possible that they can differ.

In one embodiment, the reflective structures 1005 and the exit control structures 1020 have the same index of refraction though it is possible that they can differ. In one embodiment, the reflective structures 1005 and the exit control structures 1020 have an index of refraction that is less than the index of refraction of the transparent substrates 1010, 1025.

As shown in FIG. 10, the exit control reflecting structures 1020 can be associated with the reflecting structures 1005. For example, the exit control reflecting structures 1020 can be aligned with the reflecting structures 830. In one embodiment, the cross-sectional shape of the exit control structures 1020 can be isosceles trapezoids or truncated isosceles triangles. However, it will be appreciated that the exit control reflecting structure may take the form of any shape including an isosceles triangular cross-section. In one embodiment, the width of the base of each exit control reflecting structure 1020 is equal to the width of the base of each reflecting structure 1005. Optionally, the width of the base of each exit control reflecting structure 1020 is less than the width of the base of each reflecting structure 1005 to account for any misalignment during the assembly process of the two substrates 1010, 1025. However, it will be appreciated that the reflective structures 1005 and the exit control reflecting structures 1020 can be provided in the same substrate preventing possible misalignment issues.

Each exit control reflecting structure 1020 can include a pair of sidewalls 1030 oriented at a predetermined sidewall angle (with respect to the base of the exit control reflecting structure 1020) that modifies both the direction and angle of reflection. The predetermined sidewall angle can be less than 90 degrees but greater than 0 degrees. Optionally, along the sidewalls 1030 of the exit control reflecting structure 1020, a repeated series of miniature right angle structures may be repeated. Although the illustrated geometric shape of the exit control reflecting structure 1020 is a trapezoid, the exit control reflecting structure 1020 may take the form of many shapes or combination of shapes such as a triangle where the top of the exit control reflecting structure 910 is pointed. The sidewalls 1030 can be made reflective through coating with metal or by total internal reflection (e.g., with two different index of refraction polymers or a polymer to air boundary).

In use, light can exit the reflecting structures 1005, strike the sloped sidewalls 1030 of the adjacent exit control reflecting structures 1020, and be reflected at an angle equal to the incident angle plus twice the angle of the sidewall 1030 as measured from a line perpendicular to the base of the exit control reflecting structure 1020. Essentially, the exit control reflecting structures 1020 can collimate the light as it exits the reflecting structures 1005 as shown in FIG. 9B.

Illustrated in FIG. 11 is a cross-sectional view of one embodiment of collimating device 1100 that also has reflective properties. This embodiment is similar in structure to the embodiment described above and illustrated in FIG. 10; however, a reflective material 1105 is provided on the exit control reflecting structure 1020. In one embodiment, the exit control reflecting structure 1020 can be made entirely from a reflective metal (where the aperture 1015 exists to allow the transmission of light) or can be filled with air and the reflective material 1105 can be made from metal or other reflective material.

The device 1100 having reflective and transmissive properties is capable of transmitting and reflecting light. The sum of the percent of light capable of being reflected, plus the sum of light capable of being transmitted, can be greater than 100 percent.

In one embodiment, the device 1100 can be used in an LCD stack or any other type of display. For example, the device 1100 can be positioned within the liquid crystal module itself in three configurations: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. For a two-polarizer liquid crystal display system, only the second configuration is possible in order for the display to process the light. For a single polarizer liquid crystal display system, all three configurations are possible as the display can process the light.

A process for manufacturing a liquid crystal module is disclosed whereby the device 1100 is a foil or a component within or adhered to the existing LCD stack. "Within or adhered to" includes: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. The LCD manufacturing process can be done on a roll-to-roll and/or assembled-by-layer basis for any of the embodiments described and the device is an integral part of the stack. The layers of the LCD stack are produced and/or assembled on a roll-to-roll basis, and the device is inherent as a part of the glass, pixel, collimator, or polarizer. The device construction is based on layering functional components onto a liquid crystal module substrate, allowing the device to be constructed as part of the overall liquid crystal module manufacturing process. Such elements may be glued or epoxied to the layered components. Elements such as ¼ wave plate, linear polarizers, collimating film, brightness enhancement film, polarizer film and light recycling elements may also be integrated into the liquid crystal displays or other displays such as, but not limited to, a color super twisted nematic.

There are numerous methods of manufacturing the devices discussed above. First, the device can be manufactured utilizing a mechanical process such as embossing or molding, or a chemical process such as etching. Utilizing any of these processes, the reflecting structures may be formed in the body of the transparent substrates by creating indentations (voids) in the transparent substrates. These indentations may then be filled with either a reflective material or a material that has a lower index of refraction than that of the transparent substrates. In one embodiment, the indentations may be embedded in the transparent substrates such that the base of each shape is approximately parallel to and coincident with, or slightly recessed from, the transparent substrates.

To accommodate either of these processes, the transparent substrate may require specific properties necessary for etching, molding, embossing, or other processes that alter the body of the device. Examples of suitable materials are polymers such as polycarbonate and PMMA (polymethylmethacrylate) and glass.

Regarding the reflective material for filling the indentations, suitable materials include metal or other material with a high reflectivity such as aluminum, gold, silver, nickel, chrome, a dielectric or other metallic alloy with a reflectivity of 80% or greater. The fill material for the reflective structures should be optimized to minimize absorption and have highly reflective properties for the controlled redirection of energy. Where the indentations are filled with a reflective material, a single material or composite material may be used to create the above-mentioned triangular cross-sectional rows. For example, a material that has a lower index of refraction than that of the transparent substrate may be a clear composite paste, composite material (e.g., polymer), or multiple composite materials with different refractive indices or reflective qualities. Additionally, no material (e.g., gas, air, or vacuum) may be used to fill the indentations. The minimum difference in index of refraction between the fill and the body of the element is estimated to be 0.01.

In one embodiment, the indices of refraction are the same for each reflective structure in the device. However, it will be appreciated that the indices of refraction for each reflective structure in the device may be different. Furthermore, if the reflective structures have a base (such as the base of a triangle), the material making up the base of the structure may be different than the rest of the fill material provided in the structure. For example, the base of a triangular cross-sectional structure may be constructed of aluminum, while the rest of the structure may be filled with a clear polymer having a lower index of refraction than that of the transparent substrate.

Another method of manufacturing the device includes two processes that are capable of producing the desired reflective structures in a transparent photosensitive film. The desired reflective structures can be produced by changing the index of refraction in specific areas of the body of the transparent photosensitive film.

FIG. 12 illustrates a first process for making a device having reflective and transmissive properties by forming the desired structures in a photosensitive film. As shown in FIG. 4, the process includes providing a transparent photosensitive film on the surface of a substrate. The transparent photosensitive film may be constructed of any clear material that, when exposed to light, changes its optical properties. The photosensitive material should exhibit favorable optical and mechanical properties. In addition to a sufficient photo-induced refractive index change, a suitable set of "writing" wavelengths (typically in the ultraviolet), optical transparency, thin film formability, and mechanical behavior are of great importance. Such materials may be OLED's or organic polymers that have optimized mechanical behavior, or organic-inorganic hybrids that combine the chemical versatility of organic polymers, i.e. polysilanes, polygermanes, and/or their sol-gel hybrids. Other materials include organic polymer such as specially modified polyethylene, polycarbonate, polyvinylcinnamate, and polymethylmethacrylate. Other materials include the combination a transparent polymer matrix and a polymerable photo-reactive substance comprising a photopolymerizable monomer. The transparent polymer matrix may be selected from the group consisting of polyolefins, synthetic rubbers, polyvinyl chloride, polyester, polyamide, cellulose derivatives, polyvinyl alcohol, polyacrylates, polymethacrylates, polyurethane, polyurethane acrylate, and epoxy acrylate resin. The photo-reactive substance comprises a photo-reactive initiator which has a refractive index regulating activity and said film has a distribution of a refractive index. The photopolymerizable monomer may be selected from the group consisting of tri-bromophenoxyethyl acrylate and trifluoroethyl acrylate.

A thin layer of reflective material is then deposited on the surface of the photosensitive transparent film opposite the substrate. The preferred reflective material for the thin layer of reflective metal is a metal composite or other material with a high reflectivity such as aluminum, gold, silver, nickel, chrome, a dielectric or other metallic alloy with a reflectivity of 80% or greater. Preferably, the reflectivity of the material is 95% or greater. Predetermined regions of the reflective metal deposition are then removed by ablating the reflective material to expose the photosensitive film in the predetermined regions. These predetermined regions are then exposed to a light source to change the optical characteristics of the photosensitive film in the predetermined regions to alter the index of refraction of the photosensitive film in the predetermined regions to thereby form altered refractive index areas. The steps of ablating the reflective metal and changing the optical characteristics of the photosensitive are accomplished by a light source (that faces the metal reflective layer) that may produce ultraviolet light. The light source may comprise an optical radiation source that irradiates light, at a specific wavelength and of sufficient intensity, through a micro-lenslet array so as to ablate the reflective metal layer and change the optical characteristics of the photosensitive film. In one embodiment, the radiation source is an excimer laser.

The unchanged portions of the photosensitive film comprise unaltered refractive index areas (i.e., structures) having a lower index of refraction than the altered refractive index areas. In one embodiment, the unaltered refractive index areas are triangular cross-section structures each having a base, a height, and a pair of sidewalls each having an outside surface. The base can be associated with the reflective metal layer and each sidewall is at an angle relative to the base. Preferably, the angle is between 76 degrees and less than 90 degrees. Preferably, the width of the base has a value of between about 2 and 200 microns. Preferably, the triangular cross-section structures have a height-to-base aspect ratio of between about 2 and 22. Preferably, each base of the triangular cross-section structures is separated by a distance having a value between about 1 micron and 100 microns. In one embodiment, the outside surface of the pair of sidewalls is planar. However, it will be appreciated that the outside surface of the pair of sidewalls can be concave, convex, and/or pitted. Preferably, the triangular cross-section structures are parallel to each other.

FIG. 13 illustrates a second process for making a device having reflective and transmissive properties by forming the desired structures in a photosensitive film. As shown in FIG. 13, the second process also includes forming a photosensitive film on the surface of a substrate. The transparent photosensitive film may be constructed of the same materials as discussed above. A photoresist layer is then formed on the photosensitive film. Predetermined regions of the photosensitive film and the photoresist layer are then exposed to a light source (that faces the substrate) to change the optical characteristics of the photosensitive film in the predetermined regions and to alter the index of refraction of the photosensitive film in the predetermined regions to thereby form altered refractive index areas in the photosensitive film. The light source may comprise an optical radiation source that irradiates light, at a specific wavelength and of sufficient intensity, through a micro-lenslet array so as to ablate the reflective metal layer and change the optical characteristics of the photosensitive film. Preferably, the radiation source is an excimer laser. The exposed photoresist layer in the predetermined region is then removed using a suitable etchant that creates an opening to the photosensitive film. A thin layer of reflective material is then deposited in the openings previously occupied by the exposed photoresist layer. The preferred reflective material for the thin layer of reflective metal is a metal composite or other material with a high reflectivity such as aluminum, gold, silver, nickel, chrome, a dielectric or other metallic alloy with a reflectivity of 80% or greater. Preferably, the reflectivity of the material is 95% or greater. Finally, the residual photoresist layer is washed away and lifted off.

The unchanged portions of the photosensitive film comprise unaltered refractive index areas (i.e., structures) having a higher index of refraction than the altered refractive index areas. In one embodiment, the altered refractive index areas are triangular cross-section structures each having a base, a height, and a pair of sidewalls each having an outside surface. The base can be associated with the reflective metal layer and each sidewall is at an angle relative to the base. Preferably, the angle is between 76 degrees and less than 90 degrees. Preferably, the width of the base has a value of between about 2 and 200 microns. Preferably, the triangular cross-section structures have a height-to-base aspect ratio of between about 2 and 22. Preferably, each base of the triangular cross-section structures is separated by a distance having a value between about 1 micron and 100 microns. In one embodiment, the outside surface of the pair of sidewalls is planar. However, it will be appreciated that the outside surface of the pair of sidewalls can be concave, convex, and/or pitted. Preferably, the triangular cross-section structures are parallel to each other.

In other embodiments related to utilizing a photosensitive transparent material, discrete structures may be arranged in varying structures, heights, angles, or spacing and one or more of the discrete faces of a structure, including the triangular rows, may be concave, convex, and/or pitted. Additionally, micro-shapes (such as pyramids or cones) may be deposited on one side of the body of the element directly over the base of each structure, either as part of a deposition process, described above, or as an independent process, to further control the direction of reflected energy. In other embodiments, the indices of refraction may be different for each discrete structure such that various alternating patterns are produced across the body of the element to achieve specific effects. In other embodiments, a combination of structures created by filled indentations and altering the refractive index of a photosensitive material may be used to create various patterns across the body of the element. In one embodiment, a reflective material such as metal or any material with the equivalent of a zero index of refraction may be inserted underneath the polymer-cladding layer (layer of lower index of refraction material) to reflect light exceeding the cladding's index of refraction critical angle. This will reflect light normally lost by reflecting light back into the wave-guide region. This technique may be used for all structure sizes defined above.

While specific embodiments according to the present invention have been described and illustrated herein, it will be apparent to those skilled in the art that variations and modifications are possible, such alterations shall be understood to be within the broad spirit and principle of the present invention which shall be limited solely by the scope of the claims appended hereto.

What is claimed is:

1. A collimating device comprising:
   a first transparent substrate having a first surface and a second surface, the first transparent substrate having an index of refraction;
   a plurality of wave guide structures provided in the first transparent substrate, the plurality of wave guide structures having an index of refraction different than the index of refraction of the first transparent substrate;
   a second transparent substrate having a first surface and a second surface wherein the first surface of the second transparent substrate is facing the first surface of the first transparent substrate, the second transparent substrate having an index of refraction; and
   a plurality of exit control structures provided in the second transparent substrate, the plurality of exit control structures having an index of refraction different than the index of refraction of the second transparent substrate;
   wherein the first surface of the first transparent substrate and the first surface of the second transparent substrate face each other such that each wave guide structure is generally aligned with each exit control structure thereby forming a collimating structure,
   wherein light emanating from a first direction facing the second surface of the first transparent substrate propagates through the first transparent substrate, between the plurality of wave guide structures, and is collimated as it exits adjacent collimating structures.

2. The device of claim 1 wherein the generally aligned wave guide and exit control structures are spaced apart from each other defining apertures therebetween and are generally aligned parallel to each other.

3. The device of claim 1 wherein the index of refraction of the first transparent substrate is generally the same as the index of refraction of the second transparent substrate.

4. The device of claim 3 wherein the first and second transparent substrates are constructed of a polymer.

5. The device of claim 4 wherein the index of refraction of the wave guide structure is generally the same as the index of refraction of the exit control structure.

6. The device of claim 5 wherein the index of refraction of the wave guide and exit control structures is less than the index of refraction of the first and second transparent substrates.

7. The device of claim 6 wherein the wave guide and exit control structures are defined by voids in the first and second transparent substrates, respectively.

8. The device of claim 7 wherein voids are filled with air.

9. The device of claim 7 wherein voids are filled with a metal.

10. The device of claim 1 wherein the plurality of wave guide structures each include a triangular cross-section having a base and a pair of sidewalls.

11. The device of claim 10 wherein the plurality of exit control structures each include a truncated isosceles triangular cross-section having a major base, a minor base, and a pair of sidewalls.

12. The device of claim 11 wherein the sidewalls of the wave guide structures are at an angle relative to the first surface of the first transparent substrate sufficient to reflect light striking the wave guide structure from the first direction.

13. The device of claim 12 wherein the angle of each sidewall is between about 76 degrees and less than 90 degrees.

14. The device of claim 10 wherein each of the plurality of wave guide structures have an aspect ratio of between about 2 and about 22.

15. The device of claim 11 further comprising a reflective material provided on the minor base of the exit control structure having a truncated isosceles triangular cross-section.

16. The device of claim 15 wherein the reflective material is configured to reflect light impingent thereon from a second direction opposite the first direction, and the plurality of collimating structures are configured to transmit light arriving from the first direction, wherein the sum of the percent of light being reflected relative to the light coming from the second direction, and the percent of light being transmitted relative to the amount of light coming from the first direction, is greater than 100 percent.

17. The device of claim 1, wherein each wave guide structure has a base associated with the first surface of the first transparent substrate and each exit control structure has a base associated with the first surface of the second transparent substrate.

18. The device of claim 17 wherein each respective base of the plurality of wave guide structures is contiguous with each respective base of the plurality of exit control structures.

19. A collimating device comprising:
a first transparent substrate having a first surface and a second surface;
a plurality of wave guide structures defined by voids in the first transparent substrate, each wave guide structure extending between and substantially bounded by the first surface and the second surface of the first transparent substrate;
a second transparent substrate having a first surface and a second surface; and
a plurality of exit control structures defined by voids in the second transparent substrate;
wherein the first surface of the first transparent substrate and the first surface of the second transparent substrate face each other such that each wave guide structure is generally aligned with each exit control structure thereby forming a collimating structure,
wherein light emanating from a first direction facing the second surface of the first transparent substrate is collimated as it exits adjacent collimating structures.

20. The device of claim 19 wherein voids are filled with air.

21. The device of claim 19 wherein voids are filled with a metal.

22. A collimating device comprising:
a first transparent substrate having a first surface and a second surface;
a plurality of wave guide structures extending between and bounded by the first surface and the second surface of the first transparent substrate, each wave guide structure having a base associated with the first surface of the first transparent substrate;
a second transparent substrate having a first surface and a second surface; and
a plurality of exit control structures provided in the second transparent substrate, each exit control structure having a base associated with the first surface of the second transparent substrate;
wherein the first surface of the first transparent substrate and the first surface of the second transparent substrate face each other such that each wave guide structure is generally aligned with each exit control structure thereby forming a collimating structure,
wherein light emanating from a first direction facing the second surface of the first transparent substrate is collimated as it exits adjacent collimating structures.

23. The device of claim 22, wherein each respective base of the plurality of wave guide structures is contiguous with each respective base of the plurality of exit control structures.

24. The device of claim 22 wherein the plurality of exit control structures each include a truncated isosceles triangular cross-section having a major base, a minor base, and a pair of sidewalls.

25. The device of claim 19, wherein each wave guide structure has a base associated with the first surface of the first transparent substrate and each exit control structure has a base associated with the first surface of the second transparent substrate.

* * * * *